United States Patent [19]

Granryd

[11] Patent Number: 4,694,872

[45] Date of Patent: * Sep. 22, 1987

[54] HIGH PERFORMANCE DRIVE TIRE ARRANGEMENT FOR AGRICULTURAL TRACTORS

[76] Inventor: Thorvald G. Granryd, 1260 N. Western Ave., Lake Forest, Ill. 60045

[ * ] Notice: The portion of the term of this patent subsequent to Sep. 6, 2000 has been disclaimed.

[21] Appl. No.: 757,342

[22] Filed: Aug. 5, 1985

[51] Int. Cl.[4] .................... B60C 27/20; A01B 33/00
[52] U.S. Cl. ................... 152/216; 152/209 R; 152/209 B; 152/213 A; 152/228; 172/116; 172/247; 172/292; 172/550; 180/9.26
[58] Field of Search ............. 152/225 R, 225 C, 216, 152/208, 213 R, 213 A, 217, 218, 226, 227, 228, 170, 178, 180, 185, 185.1, 190, 209 R, 209 B; 81/15.8; 301/41 R, 44 R, 44 T, 44 B, 45–47, 49; 180/9.26, 119; 188/4 B, 4 R, 5, 6; 172/536, 540, 550, 80, 105, 116, 123, 247, 292

[56] References Cited

U.S. PATENT DOCUMENTS

| | | | |
|---|---|---|---|
| 2,394,995 | 2/1946 | Guinn | 301/46 |
| 4,402,357 | 9/1983 | Granryd | 152/218 X |
| 4,508,150 | 4/1985 | Granryd | 152/225 R X |
| 4,603,916 | 8/1986 | Granryd | 152/213 A X |

Primary Examiner—Donald E. Czaja
Assistant Examiner—Thomas Bokan
Attorney, Agent, or Firm—August E. Roehrig, Jr.

[57] ABSTRACT

A lightweight device for obtaining improved performance of rubber tired vehicles. The arrangement has high-strength, thin-gauged traction intensifying means secured to the driving member for a tire, having a smooth or shallow tread, providing improved drawbar performance in fields when said traction intensifying means are engaged and improved traction and riding characteristics on hard grounds and pavements when said traction intensifying means are disengaged; and includes actuating means for rapid and convenient conversion between "steel-drive" for fields and "rubber-drive" for hard surfaces, and vice versa.

13 Claims, 13 Drawing Figures

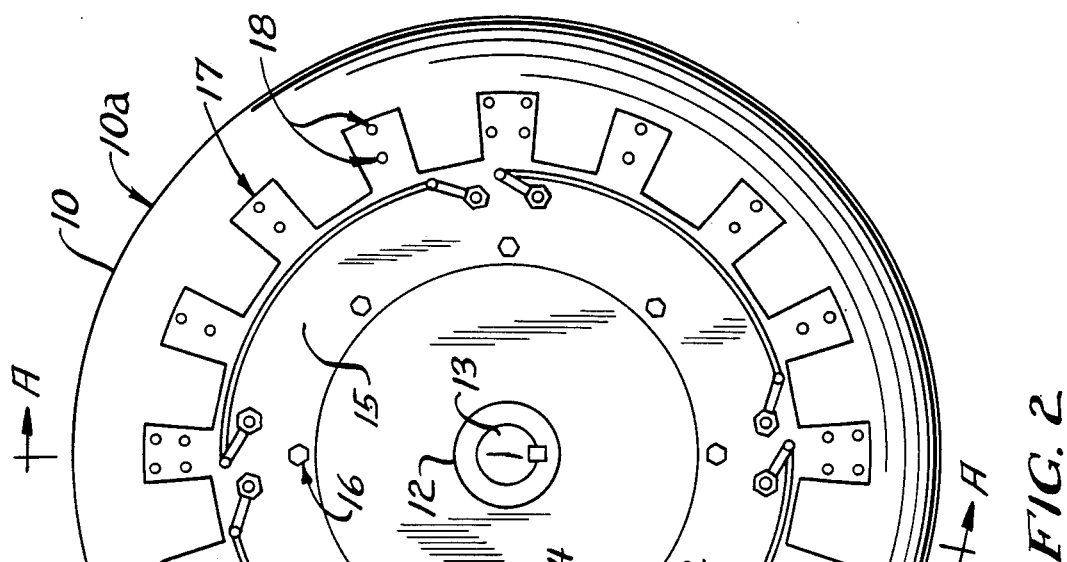
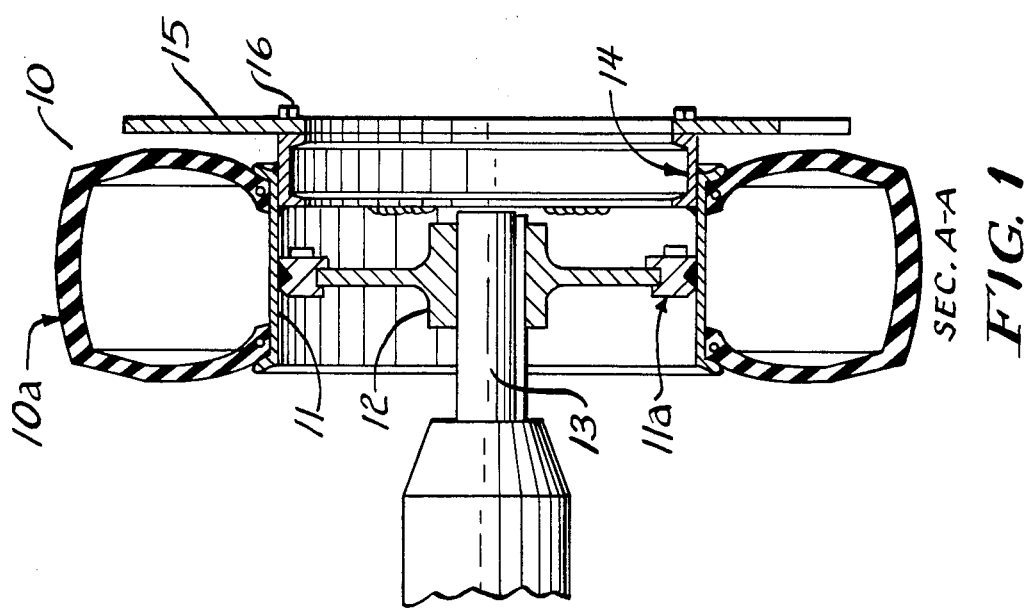

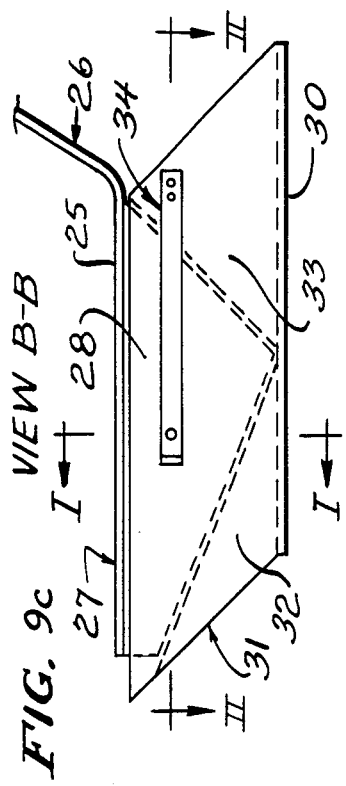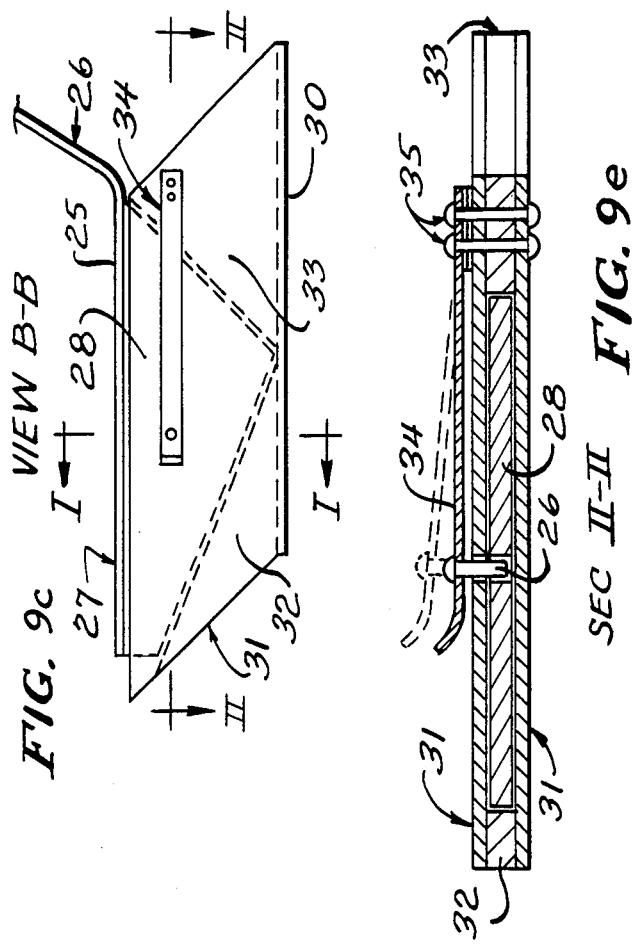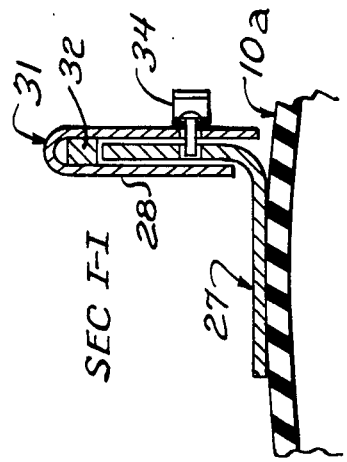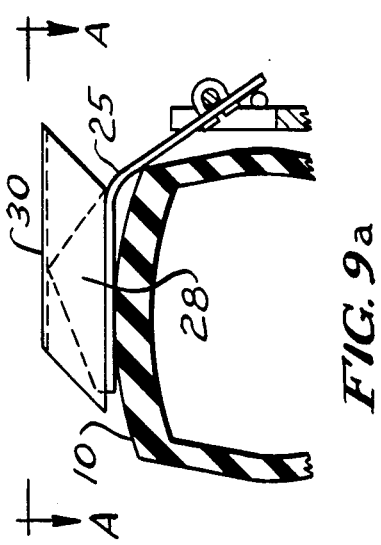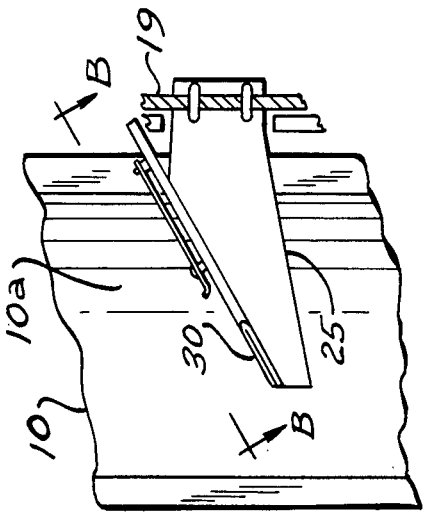

HIGH PERFORMANCE DRIVE TIRE ARRANGEMENT FOR AGRICULTURAL TRACTORS

BACKGROUND OF THE INVENTION

This invention relates generally to an arrangement and method for obtaining improved drawbar performance and added utility of agricultural wheeled tractors. Reference is made to U.S. Pat. Nos. 4,402,357 and 4,508,150 and to U.S. patent application Ser. No. 667,572 now U.S. Pat. No. 4,603,916, filed Nov. 2, 1984, the disclosure of which are incorporated herein by reference.

In the above documents the shortcomings of the pneumatic tire for a tractor's drive wheels are reviewed and methods and means for improving both productivity and for reducing soil compaction are shown. As can be concluded from these documents, much of the tire's shortcomings stem from the great variety of tasks a typical tractor is called upon to perform.

The tractor got its name because it develops traction to pull drawbar loads; notably, for pulling in fields. Not only do the widely varying field conditions call for different design criteria at the tire/soil interface, but pavement and hard ground present yet another set of circumstances. In an effort to satisfy the various demands, not only does any given size tractor come in different configurations, such as two-wheel-drive and four-wheel drive, but it also offers several drive wheel options—such as dual tires and auxiliary wheel weights. In addition, tire manufacturers are making available a great number of tire tread designs, which are available for regular bias type tires as well as for radial type tires.

Even with the proliferation of choices, there are trade-offs. An example in regard to tire tread designs is the so-called Rice & Cane, designed with high tire lugs for traction in wet rice fields. For traction, such tread design is useful in other fields as well. However, as tractors are used for pulling on roads and hard ground as well—in such use this design exhibits serious problems both in respect to traction and to tire wear; for such uses, its extra costs is rarely justified.

It is well known in the art that, (a) for best performance in fields the higher soil-values of the sub-surface layer of soil must be taken advantage of, calling for deep and aggressive tire lugs; and (b) for best performance on roads and hard grounds, the more rubber at contact-surface the better, thus calling for shallow or no tire lugs. The present invention addresses both of the above performance criteria by employing ultra-high strength steel spades, which are expeditiously engaged and retracted, in combination with tires with smooth or shallow tread.

SUMMARY OF THE INVENTION

It is therefore an object of the invention to improve traction efficiency for rubber tired vehicles.

It is another object to improve tire wear and extend tire life.

It is a further object of the invention to reduce soil compaction.

Yet a further object is to provide traction intensifying means which are readily engaged and retracted.

It is yet another object to provide an assortment of traction intensifying means for obtaining optimum drawbar performance in various ground conditions.

It is another object to improve ride characteristics on roads.

DESCRIPTION OF THE DRAWINGS

Further objects of the invention, together with additional features contributing thereto and advantages accruing therefrom, will be apparent from the following description of the preferred embodiments of the invention which are shown in the accompanying drawings with like numerals indicating corresponding parts throughout, wherein:

FIG. 1 shows a sectional view of a drive-tire and wheel assembly, with a frame secured to the rim of the tire and wheel assembly taken along line A—A of FIG. 2 with portions removed;

FIG. 2 shows a side view of a drive-tire and wheel assembly with a frame secured to the rim with lock-rings in releasing position;

FIGS. 9a–9e shows plan and sectional views of an auxiliary spade-lug for further traction intensification.

DESCRIPTION OF THE PREFERRED EMBODIMENTS

Figure 4:
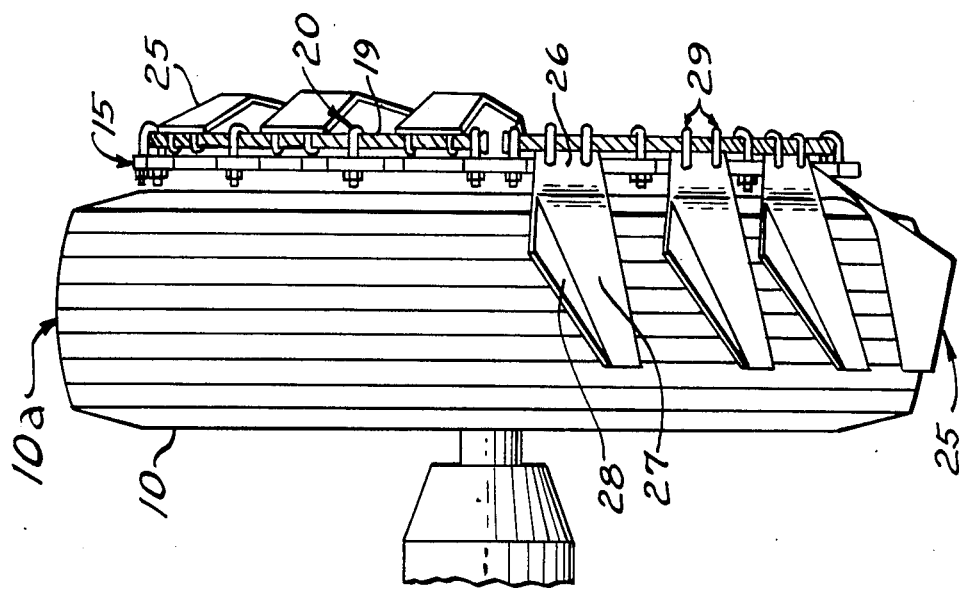
FIG. 4 shows a front view of a left drive tire assembly, with one group of spades engaged and one group of spades retracted.

Referring to FIGS. 1 and 2, there is shown a tire 10 to which is attached a frame 15. The tire 10 is formed with a shallow tread pattern or a smooth tread 10a, and is mounted upon a rim 11, securely connected to a wheel hub 12 by means of rim lugs 11a. The hub 12 is fastened to a driving axle shaft 13 of a tractor.

Onto the rim 11 there is welded a circular-shaped structural member 14, here shown as formed from regular U-channel which extends axially outward therefrom. The member 14 is positioned within the rim 11, and the outer diameter thereof is substantially equal to the inner diameter of the rim 11. Onto member 14 is bolted the frame 15, by means of fasteners 16. The frame 15 is a flat, circular disc, having a number of tongues 17 extending radially outward from its periphery; each tongue 17 is formed with a pair of radially spaced holes 18. The material for the frame 15 is selected to provide for both high strength and low weight, and may be made of a suitable grade of plastic, aluminum or a laminate of ultra-high strength sheet steel such as MartINsite M190.

Figure 3:
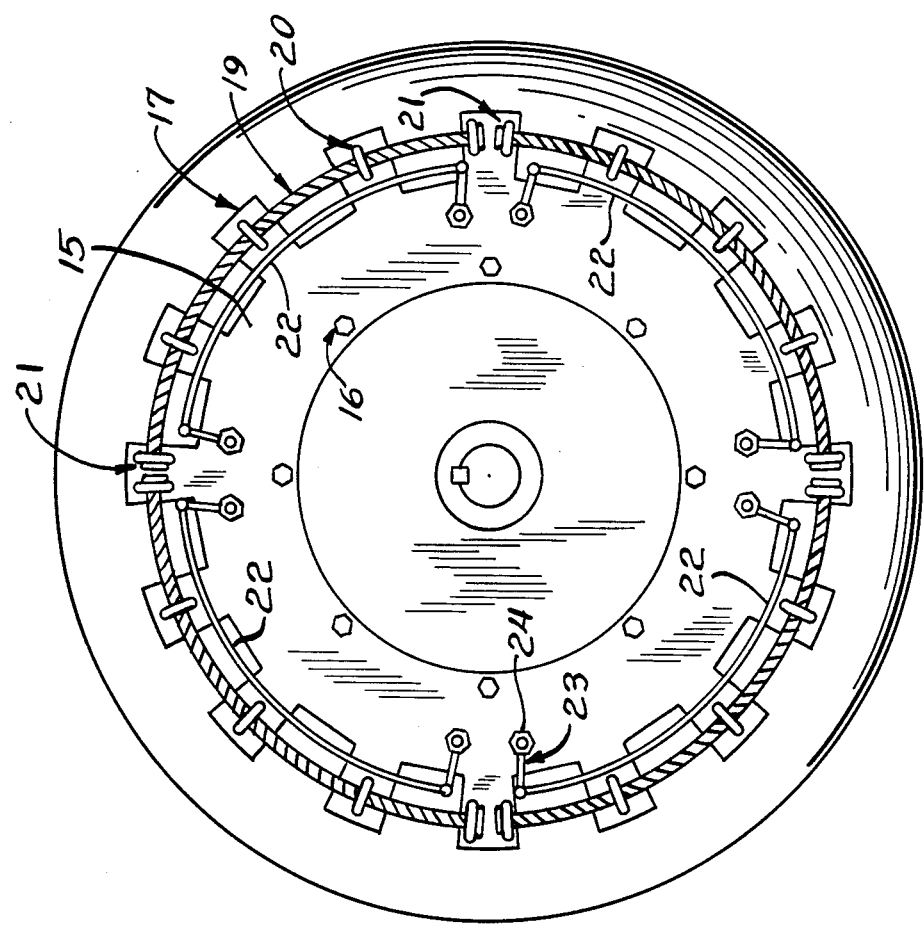
FIG. 3 shows a side view of a drive-tire and wheel assembly with the lock-rings shown in locking position and with pieces of wire rope installed.

Referring now to FIG. 3, at least two, but preferably four pieces of steel wire rope 19 are rotatably mounted onto the tongues 17, by means of anchors such as U-bolts 20 inserted through the holes 18. Each piece of wire rope 19 has a weld bead 21 extending outwardly at each end, by which it is retained against the adjacent U-bolts 20. Also shown are four lock-rings 22, which are described in detail hereinafter.

Figure 6:
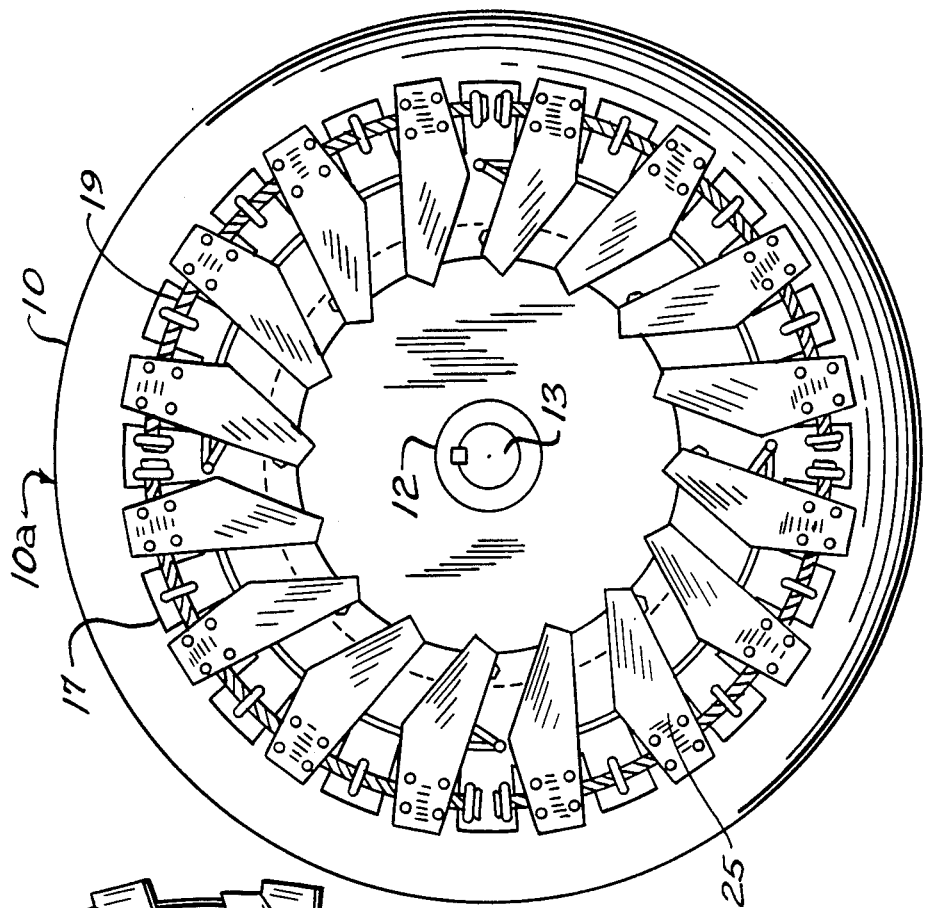
FIG. 6 is the same as FIG. 5, with the spades shown in a retracted mode of operation.
Figure 5:
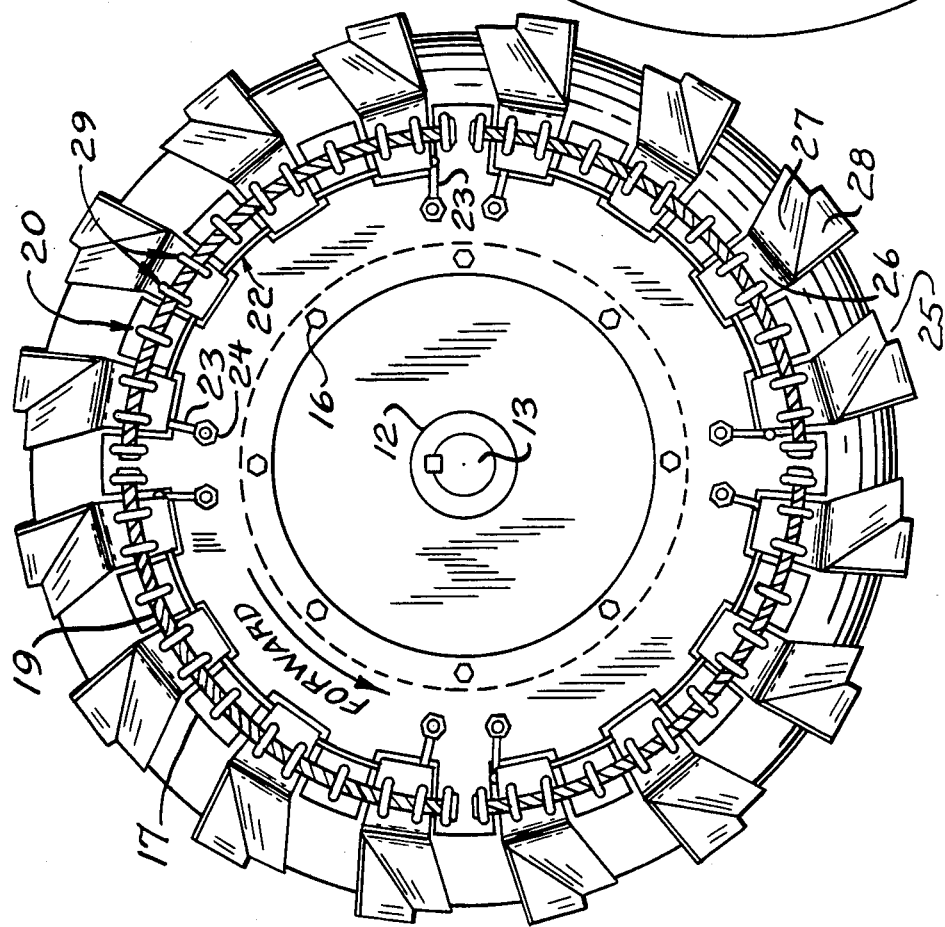
FIG. 5 shows a side view of a left drive tire assembly, with the spades in an engaged mode of operation.

In FIGS. 4, 5 and 6 there are shown traction intensifying means attached to the ropes 19. The general construction of these traction intensifying means, as well as their operation, is described in U.S. Pat. No. 4,508,150, in which there is shown wire ropes rotatably mounted on anchor rings, secured to the shoulder of the tire lugs of an agricultural drive tire.

FIG. 4 illustrates a front view of the invention as installed on a left drive wheel of a tractor. In the lower portion there is shown a group of spades 25 in an engaged mode for operation in fields; in the upper portion there is shown an adjacent group of spades 25 in a retracted mode for operation on hard ground and on pavement. As specified in the above mentioned U.S. patent, spades 25 have a base portion 26, a sole portion 27 and a lug portion 28. Each spade 25 is securely fastened at its base portion 26 onto each piece of wire rope 19 by means of serrated-type U-bolts 29. As shown, the spades 25 are operatively connected in groups of four with each group maneuvered independently from the others for easy conversion from "steel-drive" in fields to "rubber-drive" on roads, and vice versa. Each piece of wire rope 19 is functioning as a powerful torsion spring, by which the spades 25 are held firmly against the tread 10a of the tire 10 when in an engaged mode. Likewise, the spades 25 are held firmly against the frame 15 when in a retracted mode. To achieve this desirable and unique characteristic, the wire rope 19 is pre-stressed and preloaded; this procedure is described in detail in the above-referenced patent.

In FIGS. 5 and 6, the invention is shown in full. In FIG. 5, the four groups of spades 25 are shown in the engaged mode. In FIG. 6, the four groups are shown in the retracted mode of operation. As best illustrated in FIG. 5, the lock-rings 22 are shown in the locking position. Lock-rings 22 provide additional rigidity for the spades 25 when the spades are subjected to high tractive forces. Each end of the lock-rings 22 is pivotally connected to an arm 23 which, in turn, is pivotally mounted to the frame 15 by means of bolts 24. This assembly forms a four-bar linkage. By actuating either of the two arms 23 of the lock-rings 22, the lock-ring 22 is moved outwardly or inwardly relative to the tongues 17. In FIG. 2, the lock-rings 22 are shown in the releasing position. In this position the lock-rings 22 are moved inwardly to clear openings between tongues 17 and thereby allow the spades 25 to be rotated around the U-bolts 20 into the position as shown in FIG. 6.

In FIG. 3, as well as in FIG. 5, the lock-rings 22 are shown in the locking position, i.e., they have been moved outwardly to form a wedge between the tongues 17 and the base portion 26 of spades 25 when in the engaged mode of operation. This wedge action provides that the base portion 26 of the spades 25 will remain essentially parallel with the tongues 17 of frame 15 even when lug portion 28 of spades 25 are developing large drawbar pull. To provide space between the tongues 17 and the extreme end of base portion 26 of spades 25, the angle between base portion 26 and sole portion 27, is designed in such a way that the base portion points slightly outwardly when spades 25 are in the engaged mode of operation. To convert to the retracted mode of operation, either of the arms 23 must first be turned approximately 90°, as indicated in FIG. 2, respectively.

Figure 8:
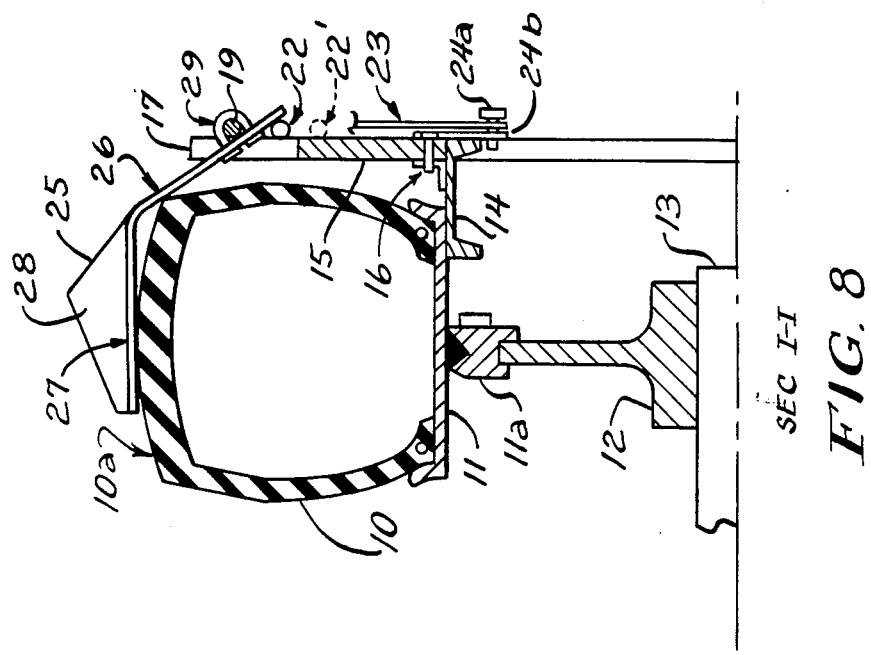
FIG. 8 shows a sectional view of FIG. 7 taken along line I—I.
Figure 7:
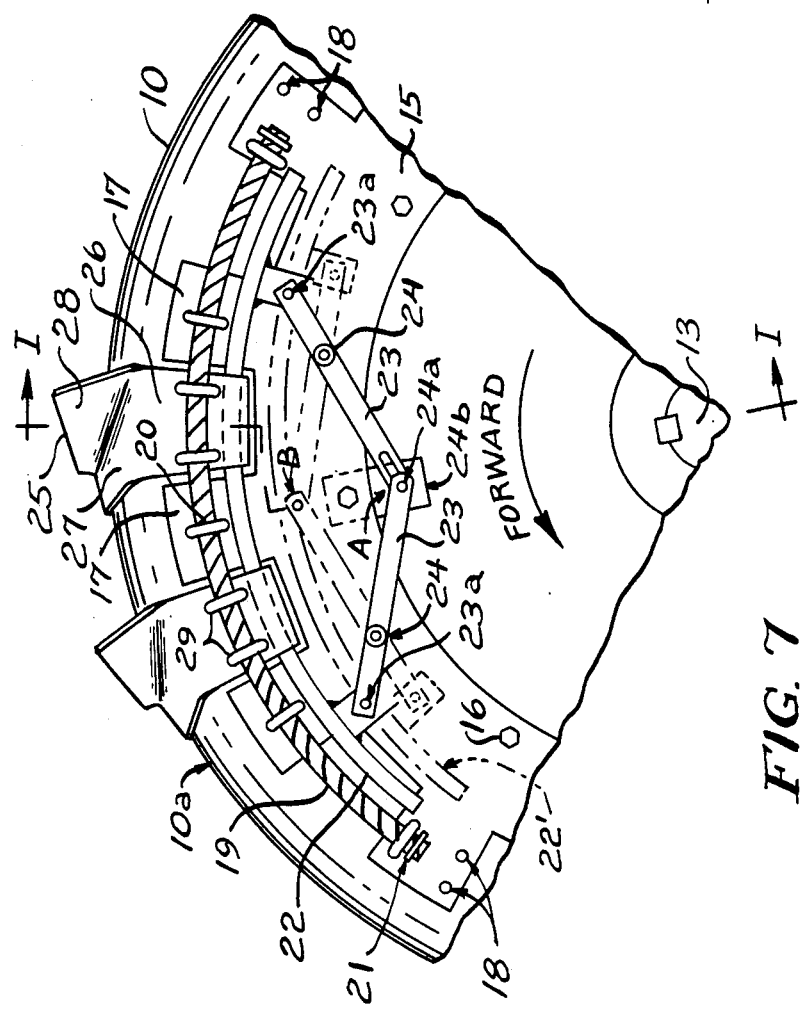
FIG. 7 shows an enlarged view of a left drive tire assembly with alternate lock-ring in locking and releasing position.

FIGS. 7 and 8 show an alternate linkage for operating the lock-rings 22. Here, the two arms 23 are extended and interlock by means of connecting pin 24a. When pin 24a is in its innermost position—the point A in FIG. 7—the lock-ring 22 is in locking position. When pin 24a is actuated radially outwards and reaches its outermost position—the point B—the lock-ring 22 is in releasing position, designated with numeral 22' in FIGS. 7 and 8. With this linkage arrangement, lock-ring 22 moves inwards or outwards in a symmetric and radial mode as the arms 23 pivot around bolts 24. It is to be noted that to achieve this action one of the arms 23 has an elongated hole as shown in FIG. 7, not enumerated. Further, the arms 23 are made from flat stock of a spring-like material and that the connecting pin 24a extends inwardly as shown in FIG. 8; this, to secure that lock-ring 22 remains in its locking position when spades 25 are engaged. This is achieved by means of a matching hole in lock-plate 24b bolted to frame 15 with fastener 16.

The material for the spades 25 is high-strength steel, for obtaining low weight, and may be formed in laminate of MartInsite, grade M190, made by Inland Steel Company. This type comes in sheet steel of up to 0.060 inches in thickness, and has spring-like characteristics. The spades may be made from stamping, formed without any heat treatment: sheets are spot- and seam-welded together in laminates of differing total thicknesses—this approach gives flexibility in design, to suit both reliability and performance criteria for tractors of different size and for fields of different ground conditions.

To address not only the different applications, but also the widely varying field conditions which agricultural tractors encounter, this invention provides two approaches. One of these, by providing an assortment of interchangeable spades of different design configurations. The other, by providing auxiliary spade-lugs, of snap-on design and of a size to amplify aggressiveness of any given spade configuration.

One such embodiment is shown in FIGS. 9a–9e. FIGS. 9a and 9b show an auxiliary lug 30 secured upon the spade 25. Referring to FIG. 9c, auxiliary lug 30 consists of a wrap-around sheet 31, two inserts 32 and 33, and a spring-lock 34. The inserts 32 and 33 are shaped to conform with the contour of lug portion 28 of spade 25 and have a thickness slightly greater than that of lug portion 28. As indicated in FIG. 9c, and further shown in FIGS. 9d and 9e, sheet 31 is spot welded to inserts 32 and 33, thereby the assembly forming a rigid structure, to be slipped onto lug portion 28 of spade 25. It is held securely in place by means of the spring-lock 34 in conjunction with a matching hole, here added to lug portion 28 as shown but not enumerated. The spring-lock 34 is fastened to the trailing side of auxiliary lug 30 by means of rivets 35 at its one end. Spring-lock 34, made of flat spring stock, has a lock-pin 36 secured at its other end, protruding through a hole in sheet 31. In the locked position, the auxiliary lug 30 is thus held securely to lug portion 28 of spade 25 by the edge of inserts 32 and 33 in conjunction with the protruding lock-pin 36. To remove the lug 30, the spring-lock 34 is lifted slightly whereupon it is easily slipped off.

With the embodiments just described, the objects of the invention are achieved. Traction efficiency is improved mainly thanks to the reduced rate of tire slippage, stemming from the sharp spades; and partly because the tractor's drive wheels may operate without, or at least greatly less amount, of ballast weight than is used with conventional drive tires. Tire wear life is improved, partly from the spades protecting the tire tread and partly by the very absence of high tire lugs, which are typical for agricultural tires. Reduced soil compaction is a significant advantage as compacted soils give lower yields and are harder to till. This object again is attained thanks to the thinness of the spades, which results in a high penetrating capacity even without ballast weights or liquid solution with the tire. The conversion tempo—that of flipping the spades between the two operating modes—is in the order of a minute or two, using a tool as discussed in the referenced patent. Finally, an assortment of spades of differing aggressiveness—for optimum performance on various types of fields and ground conditions—is obtained; either by means of different spades, readily interchanged by loosening and retightening of the U-bolts, or by means of auxiliary lugs, expeditiously added and removed. Further, the absence of high tire lugs improves ride.

It is also to be noted that the above arrangement is not confined to usage on agricultural tractors only. The concept applies also to other agricultural machines, such as combines; and further, to other rubber tired vehicles, both commercial and military type.

Further, while the invention has been described in detail with referenced embodiments, it will be understood by those skilled in the art that various changes may be made and equivalents may be substituted for elements thereof without departing from the scope of the invention. As, for example, a tire having tire lugs—new or worn—may be used in place of the tire having a smooth tread. In addition, many modifications may be made to adapt a particular situation or material to the teachings of the invention without departing from the essential scope thereof. Therefore, it is intended that the invention not be limited to the particular embodiments disclosed as the best modes contemplated for carrying out this invention, but the invention will include all embodiments falling with the scope of the appended claims.

I claim:

1. Traction intensifying means for a rubber tired vehicle having a power driven wheel, including a tire, a rim and a hub, said traction intensifying means comprising
   a structural member secured to the rim of the tire,
   frame means secured to said structural member for forming an attachment base,
   a series of ground engaging spades operatively connected to the tire in a position to be movable between ground engaging and ground avoiding positions,
   each of said ground engaging spades having a base portion, a sole portion and a lug portion,
   a plurality of anchor means operatively connected to said ground engaging spades to facilitate movement thereof between said ground engaging and ground avoiding positions,
   each one of said anchor means being secured to said frame,
   at least two lengths of wire rope, each one of said lengths being supported by said series of anchor means for rotational movement relative thereto, and
   coupling means for fixedly securing said base portion of each of said ground engaging spades onto said lengths of wire rope, such that rotational movement of said wire rope will move said ground engaging spades between said ground engaging and ground avoiding positions.

2. The traction intensifying means of claim 1, wherein said frame comprises a flat circular disc having an outer periphery and an inner periphery,
   said outer periphery including a series of tongue means for securing said anchor means, and
   said inner periphery including a series of fastening means for securing said frame to said structural member.

3. The traction intensifying means of claim 1, wherein the tire includes a tire tread, and wherein said sole portion of each of said series of ground engaging spades exerts a force against said tire tread of said tire upon said lengths of wire rope being rotatably moved in one direction to a ground engaging position, and
   said lug portion of each of said series of ground engaging spades exerts a force against said inner periphery of said flat circular disc of said frame upon said lengths of wire rope being rotatably moved in the opposite direction into a ground avoiding position.

4. The traction intensifying means of claim 2, wherein said base portion of each of said series of ground engaging spades extends essentially radially between each of said series of tongue means of said frame.

5. The traction intensifying means of claim 1, wherein each end of said lengths of wire rope includes abutment means for retaining each of said lengths of wire rope in a longitudinal direction.

6. The traction intensifying means of claim 1, wherein said tire tread comprises an essentially smooth tread pattern.

7. The traction intensifying means of claim 1, wherein said tire tread comprises an essentially shallow tread pattern.

8. The traction intensifying means of claim 1, wherein said frame further includes locking means for retaining said base portion of each of said series of ground engaging spades essentially parallel with said frame when said series of spades are in ground engaging position.

9. The traction intensifying means of claim 1, wherein each of said plurality of anchor means includes U-shaped fasteners and wherein said frame includes openings coinciding with said U-shaped fasteners for rotatably mounting said at least two lengths of wire rope.

10. The traction intensifying means of claim 1, wherein said ground engaging spades are formed from high strength steel.

11. The traction intensifying means of claim 2, wherein said frame is formed from a plastic material.

12. The traction intensifying means of claim 1, wherein said series of ground engaging spades include amplifying means comprising auxiliary spade lugs.

13. The traction intensifying means of claim 12, wherein said auxiliary spade lugs further include spring-lock means for expeditious installation and removal onto and from said ground engaging spades.

* * * * *